United States Patent
Green (10) Patent No.: US 10,253,623 B2
(45) Date of Patent: Apr. 9, 2019

(54) DIAMOND HIGH TEMPERATURE SHEAR VALVE DESIGNED TO BE USED IN EXTREME THERMAL ENVIRONMENTS

(71) Applicant: Ryan Damont Green, League City, TX (US)

(72) Inventor: Ryan Damont Green, League City, TX (US)

(73) Assignee: BAKER HUGHES, A GE COMPANT, LLC, Houston, TX (US)

(*) Notice: Subject to any disclaimer, the term of this patent is extended or adjusted under 35 U.S.C. 154(b) by 77 days.

(21) Appl. No.: 15/067,261

(22) Filed: Mar. 11, 2016

(65) Prior Publication Data

US 2017/0260831 A1 Sep. 14, 2017

(51) Int. Cl.
| | |
|---|---|
| *E21B 47/18* | (2012.01) |
| *E21B 34/06* | (2006.01) |
| *F16K 11/07* | (2006.01) |
| *F16K 31/06* | (2006.01) |
| *F16K 27/04* | (2006.01) |
| *F16K 25/00* | (2006.01) |

(52) U.S. Cl.
CPC ............ *E21B 47/185* (2013.01); *E21B 47/18* (2013.01); *E21B 34/066* (2013.01); *F16K 11/0716* (2013.01); *F16K 25/005* (2013.01); *F16K 27/048* (2013.01); *F16K 31/0613* (2013.01)

(58) Field of Classification Search
CPC ............................... E21B 47/18; E21B 47/185
See application file for complete search history.

(56) References Cited

U.S. PATENT DOCUMENTS

| | | | |
|---|---|---|---|
| 2,278,532 | A | 4/1942 | Crickmer |
| 3,065,416 | A | 11/1962 | Jeter |
| 3,523,676 | A | 8/1970 | Barker |
| 3,958,217 | A | 5/1976 | Spinnler |

(Continued)

FOREIGN PATENT DOCUMENTS

| | | |
|---|---|---|
| EP | 0088402 A2 | 9/1983 |
| JP | 2003097756 A | 4/2003 |
| WO | 2014094150 A1 | 6/2014 |

OTHER PUBLICATIONS

Schlumberger, "High Temperature Drilling Operations", https://www.slb.com/~/media/Files/drilling/brochures/drilling_applications/ht_tools_br.pdf; "An Industry Challenge", 12 pages.

(Continued)

*Primary Examiner* — Giovanna C. Wright
*Assistant Examiner* — Kristyn A Hall
(74) *Attorney, Agent, or Firm* — Cantor Colburn LLP (57) ABSTRACT

A control valve assembly includes a body having a first mud flow passage defining a mud flow inlet and one or more second mud flow passage portions. A magnetic plunger is slidingly mounted within the body. The magnetic plunger includes one or more third mud flow passage portions each including an inlet section and an outlet section configured to selectively align with the one or more second mud flow passage portions. A solenoid is mounted at the body. The solenoid is selectively activated to shift the magnetic plunger between a first position wherein the third mud flow passage portion is misaligned with the one or more second mudflow passage portions and a second position wherein the third mud flow passage portion aligns with the one or more second mud flow passage portions allowing a pulse of mud to flow through the mud flow passage.

20 Claims, 4 Drawing Sheets

(56) References Cited

U.S. PATENT DOCUMENTS

| | | |
|---|---|---|
| 3,964,556 A | 6/1976 | Gearhart |
| 4,078,620 A | 3/1978 | Westlake et al. |
| 4,336,564 A | 6/1982 | Wisniewski et al. |
| 4,351,037 A | 9/1982 | Scherbatskoy |
| 4,386,422 A | 5/1983 | Mumby |
| 4,515,225 A | 5/1985 | Dailey |
| 4,550,392 A | 10/1985 | Mumby |
| 4,628,495 A | 12/1986 | Peppers |
| 4,719,979 A | 1/1988 | Jones |
| 4,819,745 A | 4/1989 | Walter |
| 4,825,421 A | 4/1989 | Jeter |
| 4,873,488 A | 10/1989 | Barber et al. |
| 5,070,595 A | 12/1991 | Perkins et al. |
| 5,073,877 A | 12/1991 | Jeter |
| 5,103,430 A | 4/1992 | Jeter et al. |
| 5,182,731 A | 1/1993 | Hoelscher |
| 5,275,337 A | 1/1994 | Kolarik et al. |
| 5,303,776 A | 4/1994 | Ryan |
| 5,333,686 A | 8/1994 | Vaughan |
| 5,660,238 A | 8/1997 | Earl |
| 6,002,643 A | 12/1999 | Tchakarov |
| 6,016,288 A | 1/2000 | Frith |
| 6,199,823 B1 | 3/2001 | Dahlgren et al. |
| 6,328,112 B1 | 12/2001 | Malone |
| 6,464,011 B2 | 10/2002 | Tubel |
| 6,555,926 B2 | 4/2003 | Gondron |
| 6,626,244 B2 | 9/2003 | Powers |
| 6,714,138 B1 | 3/2004 | Turner |
| 6,811,135 B2 | 11/2004 | Moreno et al. |
| 6,898,150 B2 | 5/2005 | Hahn |
| 7,350,588 B2 | 4/2008 | Abercrombie Simpson et al. |
| 7,921,876 B2 | 4/2011 | Wright et al. |
| 8,365,821 B2 | 2/2013 | Hall et al. |
| 8,469,104 B2 | 6/2013 | Downton |
| 8,534,381 B1 | 9/2013 | Rinald |
| 8,627,883 B2 | 1/2014 | Richards |
| 8,627,893 B2 | 1/2014 | Otto et al. |
| 8,672,025 B2 | 3/2014 | Wolf et al. |
| 8,905,075 B2 | 12/2014 | Tower |
| 8,912,915 B2 | 12/2014 | Hay et al. |
| 2002/0117644 A1 | 8/2002 | Carrillo et al. |
| 2003/0024706 A1 | 2/2003 | Allamon |
| 2003/0047317 A1 | 3/2003 | Powers |
| 2004/0069530 A1 | 4/2004 | Prain |
| 2007/0056771 A1 | 3/2007 | Gopalan et al. |
| 2008/0236841 A1 | 10/2008 | Howlett et al. |
| 2008/0236842 A1 | 10/2008 | Bhavsar et al. |
| 2009/0114396 A1 | 5/2009 | Kusko et al. |
| 2010/0089587 A1 | 4/2010 | Stout |
| 2010/0102264 A1 | 4/2010 | Bickoff et al. |
| 2010/0195442 A1 | 8/2010 | Reyes et al. |
| 2011/0155392 A1 | 6/2011 | Frazier |
| 2011/0278017 A1 | 11/2011 | Themig et al. |
| 2012/0118582 A1 | 5/2012 | Soni et al. |
| 2012/0261603 A1 | 10/2012 | Kahn et al. |
| 2012/0279723 A1 | 11/2012 | Hofman |
| 2014/0034325 A1 | 2/2014 | Jancha et al. |
| 2014/0284112 A1 | 9/2014 | Cenac et al. |
| 2014/0332277 A1 | 11/2014 | Churchill |
| 2015/0260014 A1 | 9/2015 | Zimmerman |
| 2015/0322753 A1 | 11/2015 | Zimmerman, Jr. |
| 2016/0265350 A1 | 9/2016 | Brown-Kerr et al. |
| 2016/0341001 A1 | 11/2016 | Scholz et al. |
| 2017/0260832 A1 | 9/2017 | Green et al. |
| 2017/0260852 A1 | 9/2017 | Green et al. |

OTHER PUBLICATIONS

PCT/US2017/021327, ISR/WO dated May 10, 2017, 15 pages.
PCT/US2017/021331 ISR/WO, mailed May 31, 2017, 13 pages.
PCT/US2017/021329 ISR/WO, mailed May 10, 2017; 12 pages.

DIAMOND HIGH TEMPERATURE SHEAR VALVE DESIGNED TO BE USED IN EXTREME THERMAL ENVIRONMENTS

BACKGROUND

Downhole operations often include a downhole string that extends from an uphole system into a formation. The uphole system may include a platform, pumps, and other systems that support resource exploration, development, and extraction. In some instances, fluids may be passed from the uphole system into the formation through the downhole string. In other instances, fluid may pass from the formation through the downhole string to the uphole system. The downhole string may include various sensors that detect downhole parameters including formation parameters and parameters associated with the downhole string.

It is desirable to communicate information from downhole sensors to the uphole system. Communication may take place through wired, optical, or acoustical systems. Acoustical systems rely upon passage of pressure pulses generated downhole to an uphole receiver. The pressure pulses are created by moving a piston through a hydraulic fluid. The uphole receiver converts the pressure pulses to data indicative of sensed parameters. The pressure pulses provide useful information to uphole operators. Therefore, advances in downhole communication systems would be well received by resource exploration and recovery companies.

SUMMARY

A control valve assembly includes a body having a first mud flow passage defining a mud flow inlet and one or more second mud flow passage portions. A magnetic plunger is slidingly mounted within the body. The magnetic plunger includes one or more third mud flow passage portions each including an inlet section and an outlet section configured to selectively align with the one or more second mud flow passage portions. A solenoid is mounted at the body. The solenoid is selectively activated to shift the magnetic plunger between a first position wherein the third mud flow passage portion is misaligned with the one or more second mudflow passage portions and a second position wherein the third mud flow passage portion aligns with the one or more second mud flow passage portions allowing a pulse of mud to flow through the mud flow passage.

A resource exploration system includes an uphole system, and a downhole system having a downhole string operatively connected to the uphole system. The downhole string includes a pulser alternator generator having a main valve assembly, an alternator, and a control valve assembly operatively connected to the main valve assembly and the alternator. The control valve assembly includes a body having a first mud flow passage defining a mud flow inlet and one or more second mud flow passage portions. A magnetic plunger is slidingly mounted within the body. The magnetic plunger includes one or more third mud flow passage portions each including an inlet section and an outlet section configured to selectively align with the one or more second mud flow passage portions. A solenoid is mounted at the body. The solenoid is selectively activated to shift the magnetic plunger between a first position wherein the third mud flow passage portion is misaligned with the one or more second mudflow passage portions and a second position wherein the third mud flow passage portion aligns with the one or more second mud flow passage portions allowing a pulse of mud to flow through the mud flow passage.

BRIEF DESCRIPTION OF THE DRAWINGS

Referring now to the drawings wherein like elements are numbered alike in the several Figures.

DETAILED DESCRIPTION

Figure 1:
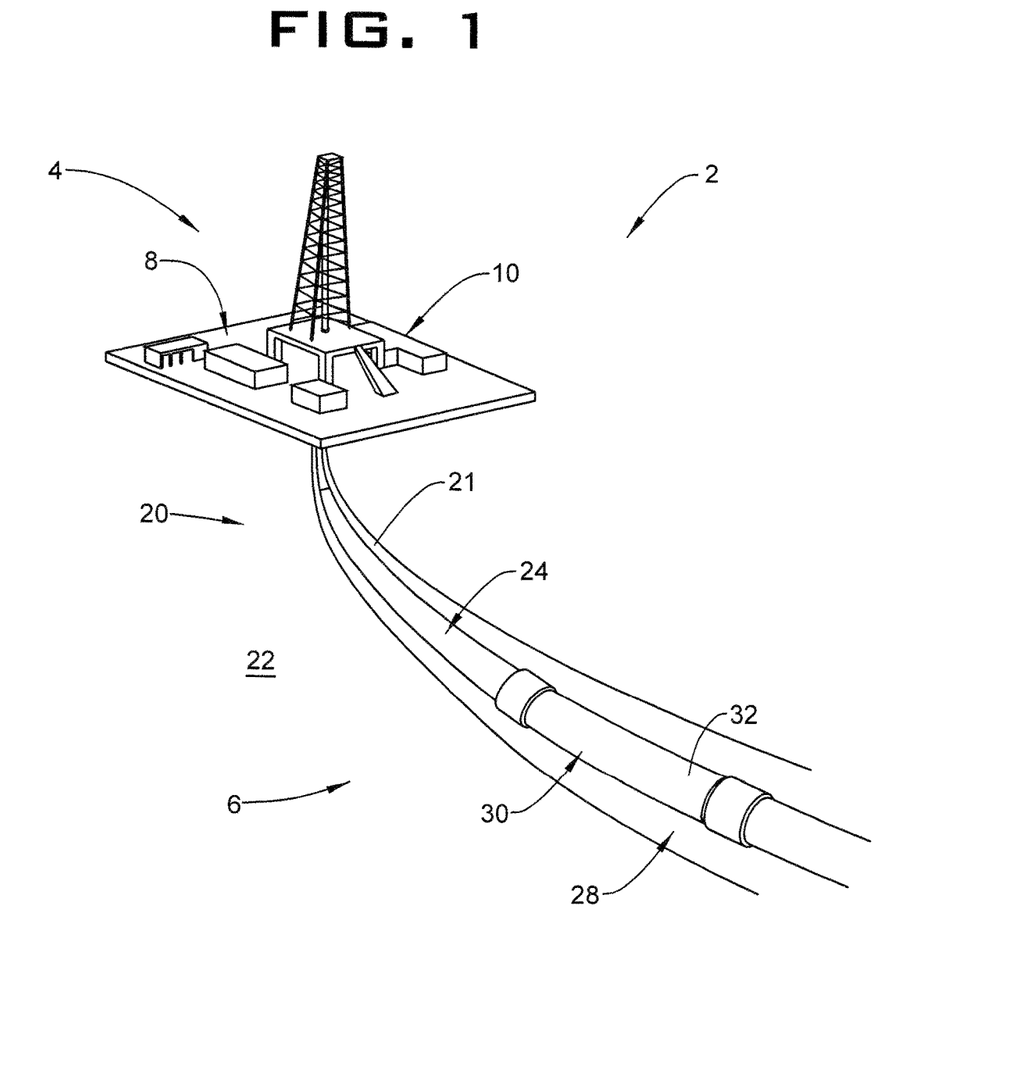
FIG. 1 depicts a resource exploration system having an uphole system operatively connected to a downhole string including a pulser alternator generator (PAG) having a plunger-type control valve assembly, in accordance with an exemplary embodiment.

A resource exploration system, in accordance with an exemplary embodiment, is indicated generally at 2, in FIG. 1. Resource exploration system 2 should be understood to include well drilling operations, resource extraction and recovery, $CO_2$ sequestration, and the like. Resource exploration system 2 may include an uphole system 4 operatively connected to a downhole system 6. Uphole system 4 may include pumps 8 that aid in completion and/or extraction processes as well as fluid storage 10. Fluid storage 10 may contain a gravel pack fluid or slurry (not shown) that is introduced into downhole system 6.

Downhole system 6 may include a downhole string 20 that is extended into a wellbore 21 formed in formation 22. Downhole string 20 may include a number of connected downhole tools or tubulars 24. One of tubulars 24 may include a pulser alternator generator (PAG) assembly 28. PAG assembly 28 may receive signals from one or more sensors (not shown) indicating one or more of formation parameters, downhole fluid parameters, tool condition parameters and the like. PAG assembly 28 creates one or more pressure pulses that are received at uphole system 4. The one or more pressure pulses define a code that may contain information regarding data received by the sensors. In accordance with an exemplary embodiment, PAG assembly 28 creates pressure pulses by selectively stopping a flow of pressurized downhole fluid or mud as will be detailed more fully below.

Figure 2:
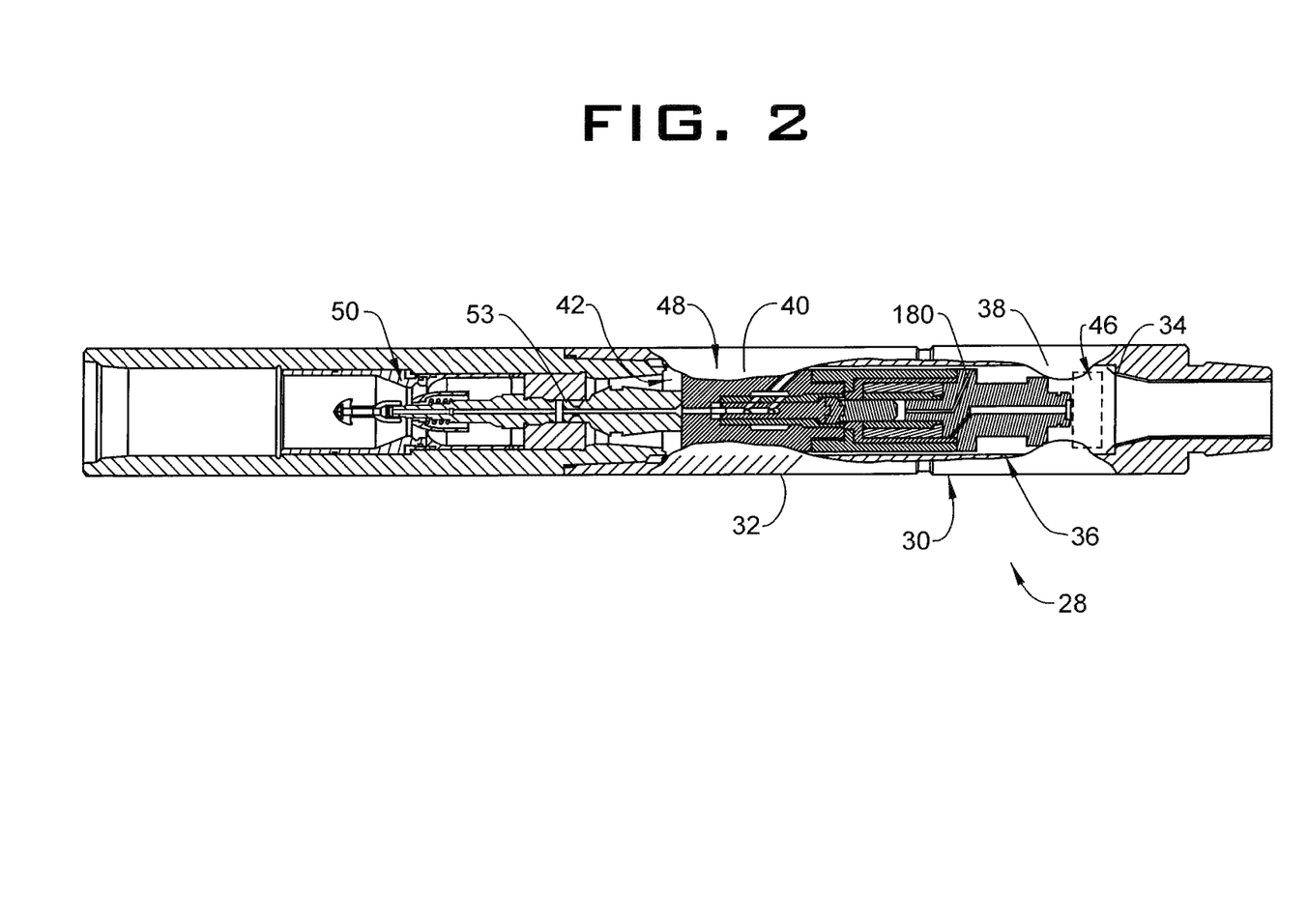
FIG. 2 depicts a partial cross-sectional view of the PAG of FIG. 1.

In accordance with an exemplary embodiment illustrated in FIG. 2, PAG assembly 28 includes a body portion 30 having an outer surface portion 32 and an inner portion 34. An inner housing 36 is arranged within inner portion 34. Inner housing 36 includes an outer surface 38 and an inner surface 40 that defines an interior portion 42. Interior portion 42 houses an alternator assembly 46, a control valve assembly (CVA) 48, and a main valve assembly (50) having a mud flow inlet portion (not separately labeled) and a mud flow outlet portion (also not separately labeled). As will be detailed more fully below, alternator assembly 46 provides signals to CVA 48 that allow drilling mud to flow through MVA 50. CVA 48 creates pressure pulses in the mud flow that provide downhole data from sensors (not shown) operatively coupled to alternator assembly 46 to uphole operators.

Figure 3:
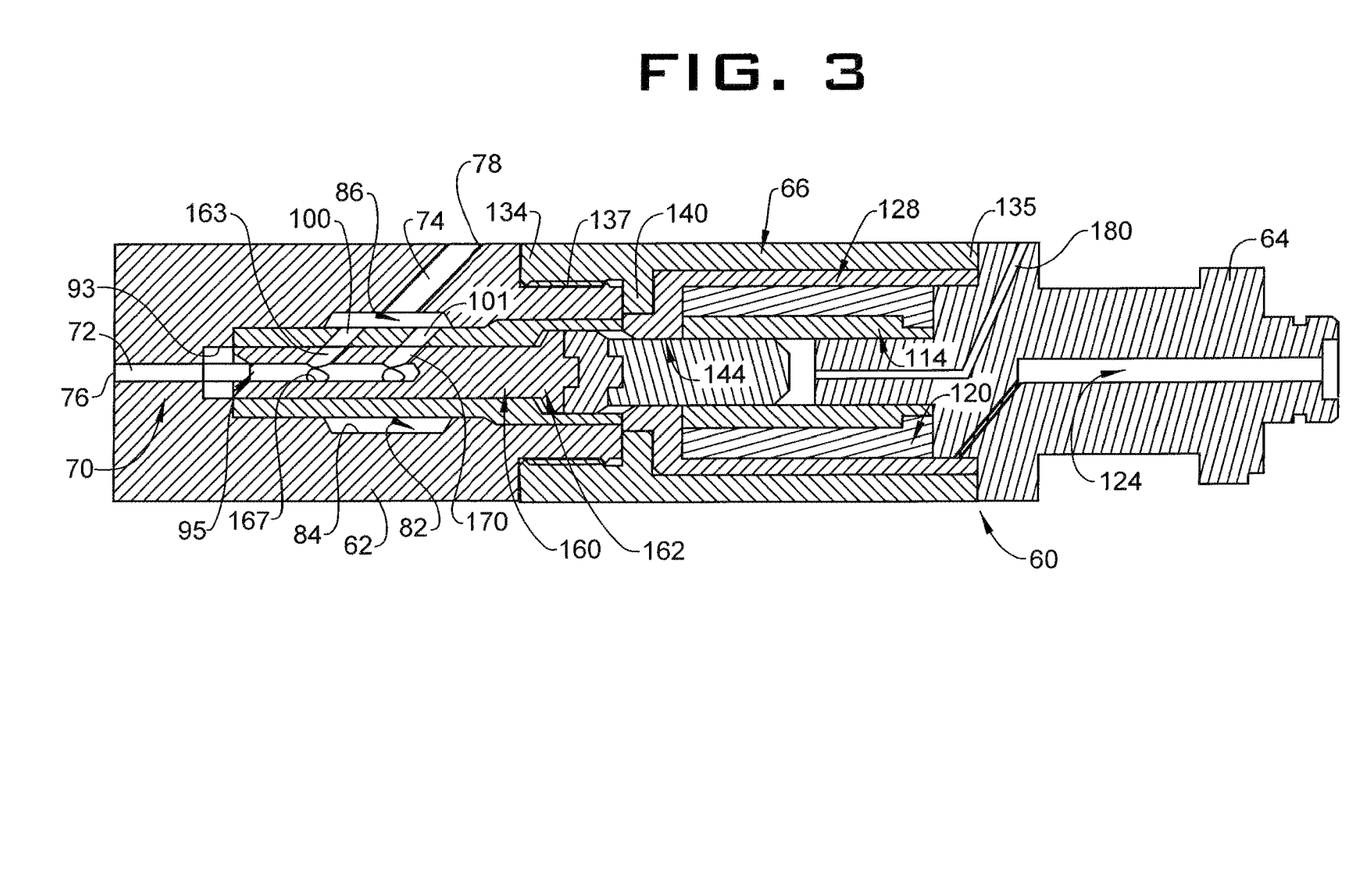
FIG. 3 depicts a partial cross-sectional view of the plunger-type control valve assembly in a first or open position.
Figure 4:
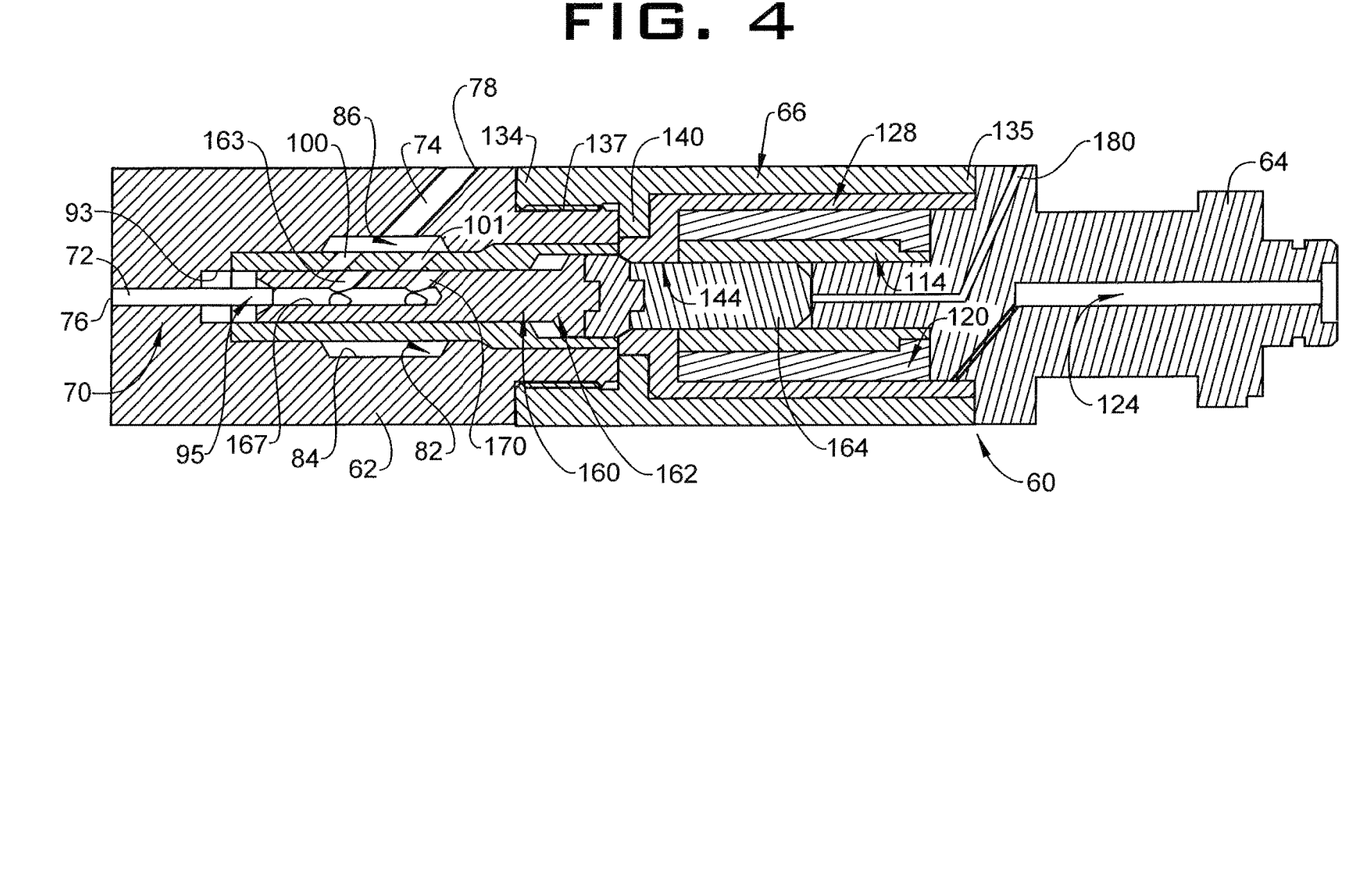
FIG. 4 depicts a partial cross-sectional view of the plunger-type control valve assembly in a second or closed position.

As shown in FIGS. 3 and 4, CVA 48 includes a body 60 having a first body portion 62 and a second body portion 64 joined by a sleeve member 66. First body portion 62 may be formed from NiO3 and includes a mud flow passage 70 having a first passage portion 72 and a second passage portion 74. First passage portion 72 defines a mud flow inlet 76 that receives a flow of mud from MVA 50 and second passage portion 74 defines a mud flow outlet 78. The number and location of second passage portions may vary. Correspondingly, the number and location of mud flow outlets may vary. First body portion 62 also includes a central passage 82 having an increased diameter portion 84 that defines a mud flow outlet chamber 86. A mud flow sleeve 90 is arranged in central passage 82. Mud flow sleeve 90 includes an outer surface 92 and an inner surface 93 that defines a channel 95. Mudflow sleeve 90 includes a third passage portion 100 and a fourth passage portion 101. Third and fourth passage portion 100 and 101 fluidically connect first passage portion 72 with second passage portion 74. The number and location of passage portions extending through mud flow sleeve 90 may vary.

Second body portion 64 may also be formed from NiO3 and includes a solenoid support 108 having an axial end 110. A solenoid carrier 114 is supported on solenoid support 108. Solenoid carrier 114 may be formed from NiO3 and provides support for a solenoid 120. Solenoid 120 is operatively connected to alternator assembly 46 through a conductor (not shown) extending through a conductor passage 124 formed in second body portion 64. A pressure sleeve 128 is mounted in second body portion 64 about solenoid 120. Pressure sleeve 128 may be formed from NiO3 and provides protection to solenoid 120 from downhole fluids passing through CVA 48.

Sleeve member 66 includes a first end section 134 and a second end section 135. First end section 134 may include a plurality of threads 137 that engage first body portion 62. Second end section 135 may be mechanically linked to second body portion 64 through, for example, a press or interference fit, or a joining process such as welding. Sleeve member 66 includes an annular flange 140 extending radially inwardly from an inner surface (not separately labeled). Annular flange 140 together with pressure sleeve 128 may define a plunger support 144. Sleeve member 66 may be formed from 9Cr so as to withstand downhole fluids. Of course, it should be understood, that the particular materials employed for solenoid carrier 114, and sleeve member 66 may vary depending on desired operating parameters and downhole conditions.

In accordance with an aspect of an exemplary embodiment, CVA 48 includes a magnetic plunger assembly 160 having a valve portion 162 operatively connected with an actuator shaft 164. Valve portion 162 is formed from diamond coated 9Cr. The use of diamond coated 9Cr allows valve portion 162 to withstand high pressure corrosive downhole mud passing from MVA 50 as will be discussed more fully below. Valve portion 162 includes a central chamber 167 fluidically connected with first passage portion 72. A fifth passage portion 169 and a sixth passage portion 170 extend through valve portion 162. A spring 174 biases magnetic plunger assembly 160 in a first position as shown in FIG. 3, wherein fifth and sixth passage portions 169 and 170 register with third and fourth passage portions 100 and 101. Solenoid 120 is selectively activated to shift magnetic plunger assembly 160 to a second position (FIG. 4) wherein fifth and sixth passage portions 169 and 170 are off-set from third and fourth passage portions 100 and 101. CVA 48 may also include a washout passage 180 that provides passage for particles to be guided out from a back side (not separately labeled) of plunger support 144. In this manner, washout passage 180 may reduce particle build up between plunger support 144 and conductor passage 124 so as to enhance an overall operability and longevity of CVA 48.

In accordance with an aspect of an exemplary embodiment, third and fourth passage portions 100, 101 and fifth and sixth passage portions 169,170 may extend at an angle of between about 20° and about 80° relative to a longitudinal axis (not separately labeled) of CVA 48. In accordance with another aspect, third and fourth passage portions 100, 101 and fifth and sixth passage portions 169,170 may extend at an angle of about 60° relative to the longitudinal axis. In this manner, shifting plunger assembly between the first position and the second position shears mud flow passing from first passage portion 72 through valve portion 162 into mud flow outlet chamber 86. In this manner, the amount of force necessary to shift magnetic plunger assembly is reduced over that which would be needed if third, fourth, fifth and sixth passage portions 100, 101, 169, and 170 projected substantially perpendicularly relative to the longitudinal axis. Further, second passage portion 74 may extend at an angle of between about 20° and about 80° relative to a longitudinal axis (not separately labeled) of CVA 48. In accordance with another aspect, second passage portion 74 may extend at an angle of about 60° relative to the longitudinal axis. The angle of second passage portion 74 reduces impact forces associated with pulses of mud passing from outlet ports 270 onto inner surface 40 may be reduced over those which would be realized if outlet ports 270 extended perpendicularly to the longitudinal axis.

In accordance with an aspect of an exemplary embodiment, alternator assembly 46 provides signals to selectively activate solenoid 120 causing magnetic plunger assembly 160 to shift from the first position (FIG. 3) to the second position (FIG. 4). Solenoid 120 may then be de-activated allowing spring 174 to bias magnetic plunger assembly 160 back to the first position. In the first position, mud may flow from MVA 50, through plunger assembly 160, into mud flow outlet chamber 86 and be expelled from mud flow outlets 78. When operated rapidly, pulses of mud pass from mud flow outlet 78 and contact inner surface 40 of inner housing 36. An uphole receiver captures pressure waves created by the pulses of mud. The pressure pulses are presented in a pattern dictated by signals received from one or more sensors at alternator assembly 46. The pressure pulses may be decrypted to provide data regarding one or more downhole parameters to uphole operators.

Set forth below are some embodiments of the foregoing disclosure:

Embodiment 1

A control valve assembly comprising: a body including a first mud flow passage defining a mud flow inlet and one or more second mud flow passage portions; a magnetic plunger slidingly mounted within the body, the magnetic plunger including one or more third mud flow passage portions each including an inlet section and an outlet section configured to selectively align with the one or more second mud flow passage portions; and a solenoid mounted at the body, the solenoid being selectively activated to shift the magnetic plunger between a first position wherein the third mud flow passage portion is misaligned with the one or more second mudflow passage portions and a second position wherein the third mud flow passage portion aligns with the one or more second mud flow passage portions allowing a pulse of mud to flow through the mud flow passage.

Embodiment 2

The control valve assembly according to claim 1, wherein the body includes a first body portion mechanically linked to a second body portion by a sleeve member, the first body portion including a central passage receptive of the magnetic plunger.

Embodiment 3

The control valve assembly according to claim 2, further comprising: a mud flow sleeve arranged in the central passage, the one or more second passage portions being formed in the mud flow sleeve.

Embodiment 4

The control valve assembly according to claim 3, wherein the first body portion includes a fourth mud flow passage portion fluidically connected to the one or more second mud flow passage portions.

Embodiment 5

The control valve assembly according to claim 3, wherein the central passage includes an increased diameter portion defining a mud flow outlet chamber fluidically connected to the one or more second mud flow passage portions.

Embodiment 6

The control valve assembly according to claim 1, wherein the magnetic plunger is formed from diamond coated 9Cr.

Embodiment 7

The control valve assembly according to claim 1, wherein the second body portion includes a solenoid support and a solenoid carrier mounted to the solenoid support, the solenoid being carried by the solenoid carrier.

Embodiment 8

The control valve assembly according to claim 7, further comprising: a solenoid sleeve extending about the solenoid, the solenoid sleeve being formed from 9Cr.

Embodiment 9

The control valve assembly according to claim 7, wherein the magnetic plunger includes an actuating shaft slidably received by the solenoid carrier.

Embodiment 10

The control valve assembly according to claim 9, further comprising: a spring arranged between the actuating shaft and the solenoid support, the spring biasing the magnetic plunger toward one of the first and second positions.

Embodiment 11

The control valve assembly according to claim 1, wherein the one or more second mud flow passage portions includes at least two second mud flow passage portions and the one or more third mud flow passage portions includes at least two third mud flow passage portions.

Embodiment 12

A resource exploration system comprising: an uphole system; and a downhole system including a downhole string operatively connected to the uphole system, the downhole string including a pulser alternator generator having a main valve assembly, an alternator, and a control valve assembly operatively connected to the main valve assembly and the alternator, the control valve assembly comprising: a body including a first mud flow passage defining a mud flow inlet and one or more second mud flow passage portions; a magnetic plunger slidingly mounted within the body, the magnetic plunger including one or more third mud flow passage portions each including an inlet section and an outlet section configured to selectively align with the one or more second mud flow passage portions; and a solenoid mounted at the body, the solenoid being selectively activated to shift the magnetic plunger between a first position wherein the third mud flow passage portion is misaligned with the one or more second mudflow passage portions and a second position wherein the third mud flow passage portion aligns with the one or more second mud flow passage portions allowing a pulse of mud to flow through the mud flow passage.

Embodiment 13

The resource exploration system according to claim 12, wherein the body includes a first body portion mechanically linked to a second body portion by a sleeve member, the first body portion including a central passage receptive of the magnetic plunger.

Embodiment 14

The resource exploration system according to claim 13, further comprising: a mud flow sleeve arranged in the central passage, the one or more second passage portions being formed in the mud flow sleeve.

Embodiment 15

The resource exploration system according to claim 14, wherein the first body portion includes a fourth mud flow passage portion fluidically connected to the one or more second mud flow passage portions.

Embodiment 16

The resource exploration system according to claim 14, wherein the central passage includes an increased diameter portion defining a mud flow outlet chamber fluidically connected to the one or more second mud flow passage portions.

Embodiment 17

The resource exploration system according to claim 12, wherein the magnetic plunger is formed from diamond coated 9Cr.

Embodiment 18

The resource exploration system according to claim 12, wherein the second body portion includes a solenoid support and a solenoid carrier mounted to the solenoid support, the solenoid being carried by the solenoid carrier.

Embodiment 19

The resource exploration system according to claim 18, further comprising: a solenoid sleeve extending about the solenoid, the solenoid sleeve being formed from 9Cr.

Embodiment 20

The resource exploration system according to claim 18, wherein the magnetic plunger includes an actuating shaft slidably received by the solenoid carrier.

Embodiment 21

The resource exploration system according to claim 20, further comprising: a spring arranged between the actuating shaft and the solenoid support, the spring biasing the magnetic plunger toward one of the first and second positions.

Embodiment 22

The resource exploration system according to claim 13, wherein the one or more second mud flow passage portions includes at least two second mud flow passage portions and the one or more third mud flow passage portions includes at least two third mud flow passage portions.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc.

The term "about" is intended to include the degree of error associated with measurement of the particular quantity based upon the equipment available at the time of filing the application. For example, "about" can include a range of ±8% or 5%, or 2% of a given value.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A control valve assembly comprising:
a body including a first mud flow passage defining a mud flow inlet and one or more second mud flow passage portions, wherein the body includes a first body portion mechanically linked to a second body portion by a sleeve member, the first body portion including a central passage;
a magnetic plunger slidingly mounted within the central passage of the body, the magnetic plunger including one or more third mud flow passage portions each including an inlet section and an outlet section configured to selectively align with the one or more second mud flow passage portions; and
a solenoid mounted at the body, the solenoid being selectively activated to shift the magnetic plunger between a first position wherein the third mud flow passage portion is misaligned with the one or more second mudflow passage portions and a second position wherein the third mud flow passage portion aligns with the one or more second mud flow passage portions allowing a pulse of mud to flow through the mud flow passage.

2. The control valve assembly according to claim 1, further comprising: a mud flow sleeve arranged in the central passage, the one or more second passage portions being formed in the mud flow sleeve.

3. The control valve assembly according to claim 2, wherein the first body portion includes a fourth mud flow passage portion fluidically connected to the one or more second mud flow passage portions.

4. The control valve assembly according to claim 2, wherein the central passage includes an increased diameter portion defining a mud flow outlet chamber fluidically connected to the one or more second mud flow passage portions.

5. The control valve assembly according to claim 1, wherein the magnetic plunger is formed from diamond coated 9Cr.

6. The control valve assembly according to claim 1, wherein the second body portion includes a solenoid support and a solenoid carrier mounted to the solenoid support, the solenoid being carried by the solenoid carrier.

7. The control valve assembly according to claim 6, further comprising: a solenoid sleeve extending about the solenoid, the solenoid sleeve being formed from 9Cr.

8. The control valve assembly according to claim 6, wherein the magnetic plunger includes an actuating shaft slidably received by the solenoid carrier.

9. The control valve assembly according to claim 8, further comprising: a spring arranged between the actuating shaft and the solenoid support, the spring biasing the magnetic plunger toward one of the first and second positions.

10. The control valve assembly according to claim 1, wherein the one or more second mud flow passage portions includes at least two second mud flow passage portions and the one or more third mud flow passage portions includes at least two third mud flow passage portions.

11. A resource exploration system comprising:
an uphole system; and
a downhole system including a downhole string operatively connected to the uphole system, the downhole string including a pulser alternator generator having a main valve assembly, an alternator, and a control valve assembly operatively connected to the main valve assembly and the alternator, the control valve assembly comprising:
a body including a first mud flow passage defining a mud flow inlet and one or more second mud flow passage portions, wherein the body includes a first body portion mechanically linked to a second body portion by a sleeve member, the first body portion including a central passage;
a magnetic plunger slidingly mounted within the central passage of the body, the magnetic plunger including one or more third mud flow passage portions each including an inlet section and an outlet section configured to selectively align with the one or more second mud flow passage portions; and
a solenoid mounted at the body, the solenoid being selectively activated to shift the magnetic plunger between a first position wherein the third mud flow passage portion is misaligned with the one or more second mudflow passage portions and a second position wherein the third mud flow passage portion aligns with the one or more second mud flow passage portions allowing a pulse of mud to flow through the mud flow passage.

12. The resource exploration system according to claim 11, further comprising: a mud flow sleeve arranged in the central passage, the one or more second passage portions being formed in the mud flow sleeve.

13. The resource exploration system according to claim 12, wherein the first body portion includes a fourth mud flow passage portion fluidically connected to the one or more second mud flow passage portions.

14. The resource exploration system according to claim 12, wherein the central passage includes an increased diameter portion defining a mud flow outlet chamber fluidically connected to the one or more second mud flow passage portions.

15. The resource exploration system according to claim 11, wherein the magnetic plunger is formed from diamond coated 9Cr.

16. The resource exploration system according to claim 11, wherein the second body portion includes a solenoid support and a solenoid carrier mounted to the solenoid support, the solenoid being carried by the solenoid carrier.

17. The resource exploration system according to claim 16, further comprising: a solenoid sleeve extending about the solenoid, the solenoid sleeve being formed from 9Cr.

18. The resource exploration system according to claim 16, wherein the magnetic plunger includes an actuating shaft slidably received by the solenoid carrier.

19. The resource exploration system according to claim 18, further comprising: a spring arranged between the actuating shaft and the solenoid support, the spring biasing the magnetic plunger toward one of the first and second positions.

20. The resource exploration system according to claim 11, wherein the one or more second mud flow passage portions includes at least two second mud flow passage portions and the one or more third mud flow passage portions includes at least two third mud flow passage portions.

* * * * *